(12) United States Patent
Mitsuhashi et al.

(10) Patent No.: US 11,427,432 B2
(45) Date of Patent: Aug. 30, 2022

(54) SPINDLE UNIT

(71) Applicant: OGURA CLUTCH CO., LTD., Kiryu (JP)

(72) Inventors: Takashi Mitsuhashi, Kiryu (JP); Yoshiyuki Matsumoto, Kiryu (JP); Nobuyuki Shuto, Kiryu (JP)

(73) Assignee: OGURA CLUTCH CO., LTD., Kiryu (JP)

( * ) Notice: Subject to any disclaimer, the term of this patent is extended or adjusted under 35 U.S.C. 154(b) by 351 days.

(21) Appl. No.: 16/829,959

(22) Filed: Mar. 25, 2020

(65) Prior Publication Data
US 2020/0317464 A1 Oct. 8, 2020

(30) Foreign Application Priority Data

Apr. 3, 2019 (JP) .............................. JP2019-071109

(51) Int. Cl.
*F16D 63/00* (2006.01)
*B65H 59/38* (2006.01)
*F16D 121/20* (2012.01)

(52) U.S. Cl.
CPC ......... *B65H 59/387* (2013.01); *F16D 63/002* (2013.01); *F16D 2121/20* (2013.01)

(58) Field of Classification Search
CPC ........... B65H 59/387; B65H 2701/314; B65H 49/26; B65H 59/04; F16D 63/002; F16D 2121/20
See application file for complete search history.

(56) References Cited

U.S. PATENT DOCUMENTS

| 5,238,095 A | * | 8/1993 | Pedu | H02K 49/065 |
| | | | | 192/84.1 |
| 6,232,686 B1 | * | 5/2001 | Schneider | H02K 49/065 |
| | | | | 310/78 |
| 9,783,388 B2 | * | 10/2017 | Matsumoto | B65H 59/382 |

FOREIGN PATENT DOCUMENTS

| JP | H10-310955 A | 11/1998 |
| JP | 6392757 B | 9/2018 |

* cited by examiner

*Primary Examiner* — David J Hlavka
(74) *Attorney, Agent, or Firm* — Womble Bond Dickinson (US) LLP

(57) ABSTRACT

A spindle unit includes a support shaft, an electromagnetic air-gap brake, a spindle member, and a coupler. The support shaft is attached to the stationary frame of a creel. The brake is connected to the front end of the support shaft. The spindle member is rotatably supported by the support shaft in a state in which the support shaft and the brake are inserted in the spindle member. The coupler couples the spindle member and the brake shaft.

9 Claims, 5 Drawing Sheets

SPINDLE UNIT

CROSS-REFERENCE TO RELATED APPLICATIONS

This application claims the benefit of foreign priority to Japanese Patent Application No. 2019-071109, filed on Apr. 3, 2019, which is incorporated by reference in its entirety.

BACKGROUND OF THE INVENTION

The present invention relates to a thread supply spindle unit supporting a bobbin wound with a thread supplied to a weaving machine.

A creel configured to supply a special thread such as carbon fiber to a weaving machine includes a spindle unit that rotatably supports a thread-wound bobbin. As disclosed in Japanese Patent Laid-Open No. 10-310955 (literature 1), the spindle unit includes a spindle member including a rotating shaft rotatably supported by a frame, and a brake unit that brakes the spindle member. The brake unit is supported by the frame and connected to the proximal end of the rotating shaft via a gear.

In the spindle unit disclosed in literature 1, the spindle member and the brake unit are arranged side by side. This upsizes the entire unit.

SUMMARY OF THE INVENTION

It is an object of the present invention to provide a compact spindle unit.

According to one aspect of the present invention, there is provided a spindle unit comprising a support shaft including a first end that includes an attaching structure to a stationary frame, and a second end, an electromagnetic air-gap brake that includes a brake shaft to which resistance is applied upon rotation, and that is connected to the second end of the support shaft and positioned on the same axis as an axis of the support shaft, a spindle member that is formed into a cylindrical shape and is rotatably supported by the support shaft in a state in which the support shaft and the electromagnetic air-gap brake are inserted in the spindle member, a thread-wound bobbin being detachably mounted around the spindle member, and a coupler that couples the spindle member and the brake shaft to make the spindle member and the brake shaft interlock with each other.

DESCRIPTION OF THE PREFERRED EMBODIMENTS

A spindle unit according to an embodiment of the present invention will now be described in detail with reference to FIGS. 1 to 6.

Figure 1:
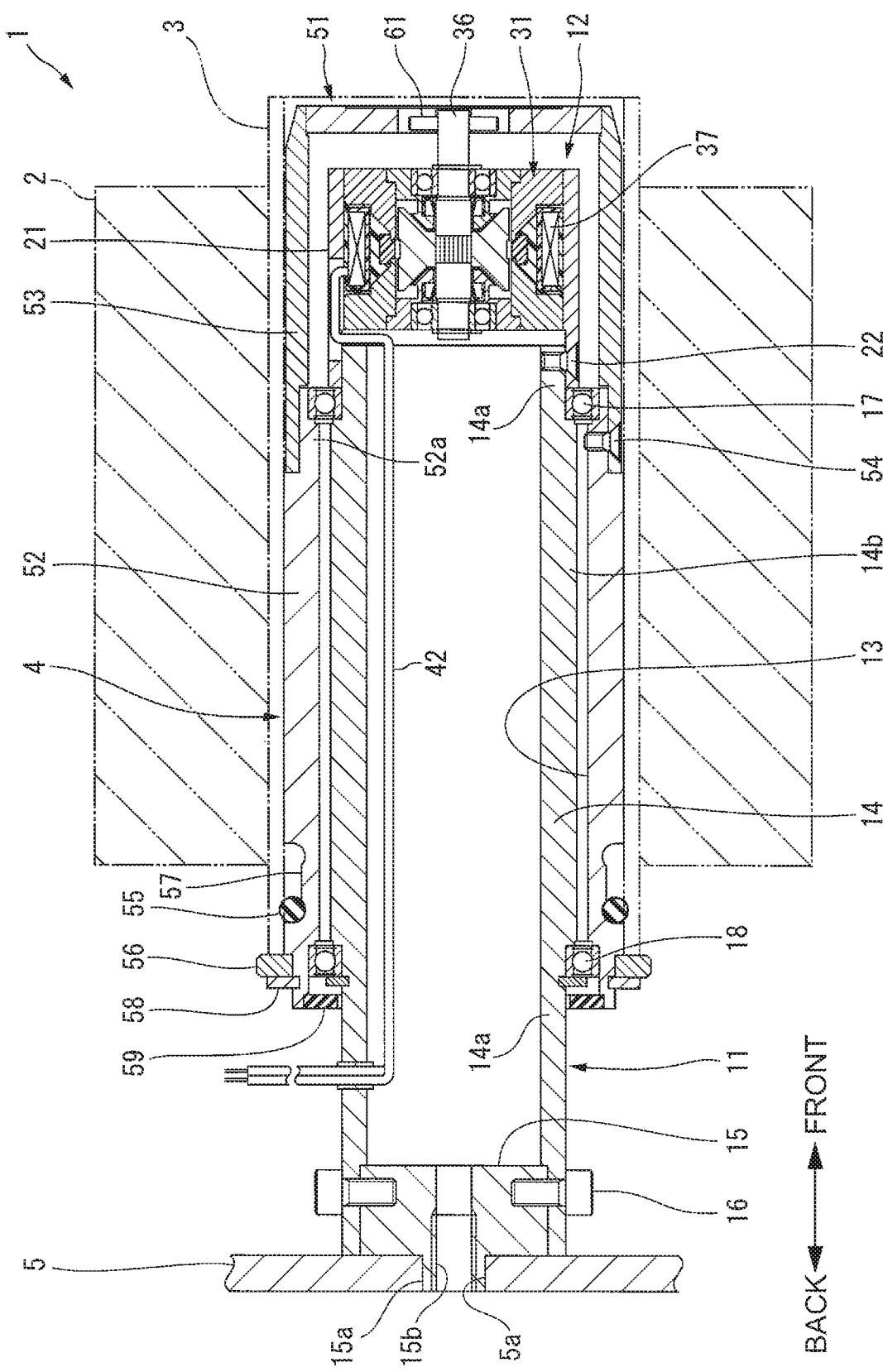
FIG. 1 is a sectional view of a spindle unit according to an embodiment of the present invention.

A spindle unit 1 shown in FIG. 1 is a thread supply spindle unit used in a creel (not shown) configured to pull out a special thread 2 (to be simply referred to as a thread 2 hereinafter) made of carbon fiber. The thread 2 is wound around a bobbin 3 and held.

The bobbin 3 is cylindrical. A spindle member 4 (to be described later) of the spindle unit 1 is detachably inserted into the hollow shaft center of the bobbin 3. The spindle member 4 is inserted into the bobbin 3 from a right front end in FIG. 1. In the following description, when a direction is indicated to explain the arrangement of the spindle unit 1, a right side in FIG. 1 will be called a front side and a left side will be called a back side for convenience.

The spindle unit 1 is attached to a stationary frame 5 of the creel on the leftmost side in FIG. 1, and projects forward like a cantilever from the stationary frame 5. The spindle unit 1 includes a support shaft 11 fixed to the stationary frame 5, an electromagnetic air-gap brake 12 (to be simply referred to as a brake 12 hereinafter) connected to the front end of the support shaft 11, and the spindle member 4 including a hollow portion 13 to which the support shaft 11 and the brake 12 can be inserted. The spindle member 4 is rotatably supported by the support shaft 11 in a state in which the support shaft 11 and the brake 12 are inserted in the hollow portion 13.

The support shaft 11 includes a cylindrical member 14 extending in the back-and-forth direction, and an attaching flange 15 provided at the back end of the cylindrical member 14 (the first end of the support shaft 11). The attaching flange 15 is formed into a disc shape and fixed to the cylindrical member 14 by a fixing bolt 16 extending in the radial direction of the cylindrical member 14. A tubular projection 15a is formed at the shaft center of the attaching flange 15 and fitted in a through hole 5a of the stationary frame 5. An internal thread 15b is formed inside the tubular projection 15a. The attaching flange 15 including the tubular projection 15a and the internal thread 15b constitutes an "attaching structure to the stationary frame" for attaching the support shaft 11 to the stationary frame 5. The spindle unit 1 is fixed to the stationary frame 5 by screwing a fixing bolt (not shown) into the internal thread 15b from the back of the stationary frame 5.

The cylindrical member 14 includes small-diameter portions 14a relatively small in outer diameter at the front and back ends, and a maximum-diameter portion 14b relatively large in outer diameter at the center. Bearings 17 and 18 are provided at boundaries between the small-diameter portions 14a and the maximum-diameter portion 14b at the outer peripheral portion of the cylindrical member 14 and rotatably support the spindle member 4 (to be described later). More specifically, the bearings 17 and 18 are interposed between the outer peripheral portion of the cylindrical member 14 of the support shaft 11 and the inner peripheral surface of the spindle member 4.

The brake 12 is positioned on the same axis as that of the support shaft 11 and connected to the front end (second end) of the support shaft 11 (cylindrical member 14). The brake 12 is connected to the support shaft 11 using a cylindrical tubular member 21 that forms a housing on the outermost side of the brake 12. The tubular member 21 is fitted from the front on the outer peripheral surface of the small-diameter portion 14a of the cylindrical member 14, and fixed to the small-diameter portion 14a by a plurality of fixing screws 22 that pass through the tubular member 21 in the radial direction and are threaded to the small-diameter portion 14a. In this embodiment, two fixing screws 22 are used. The fixing screws 22 pass through through holes 23

(see FIGS. 4 and 5) provided at two portions of the tubular member 21 in the circumferential direction. The outer diameter of the tubular member 21 is almost equal to that of the maximum-diameter portion 14b positioned between the two bearings 17 and 18 of the cylindrical member 14.

The brake 12 according to this embodiment is formed from an electromagnetic powder brake. Although not shown, the brake 12 can also be formed from an electromagnetic hysteresis brake, which is one of electromagnetic air-gap brakes. The electromagnetic hysteresis brake can be, for example, an electromagnet type as disclosed in Japanese Patent No. 6392757 (literature 2) or a permanent magnet type. The permanent magnet type electromagnetic hysteresis brake includes a hysteresis member that is formed from a magnetic material and rotates together with a brake shaft, and a plurality of permanent magnets arranged so that a magnetic flux passes through the hysteresis member. The permanent magnet type electromagnetic hysteresis brake controls the magnitude of braking force by changing the positions of the permanent magnets by a motor.

Figure 3:
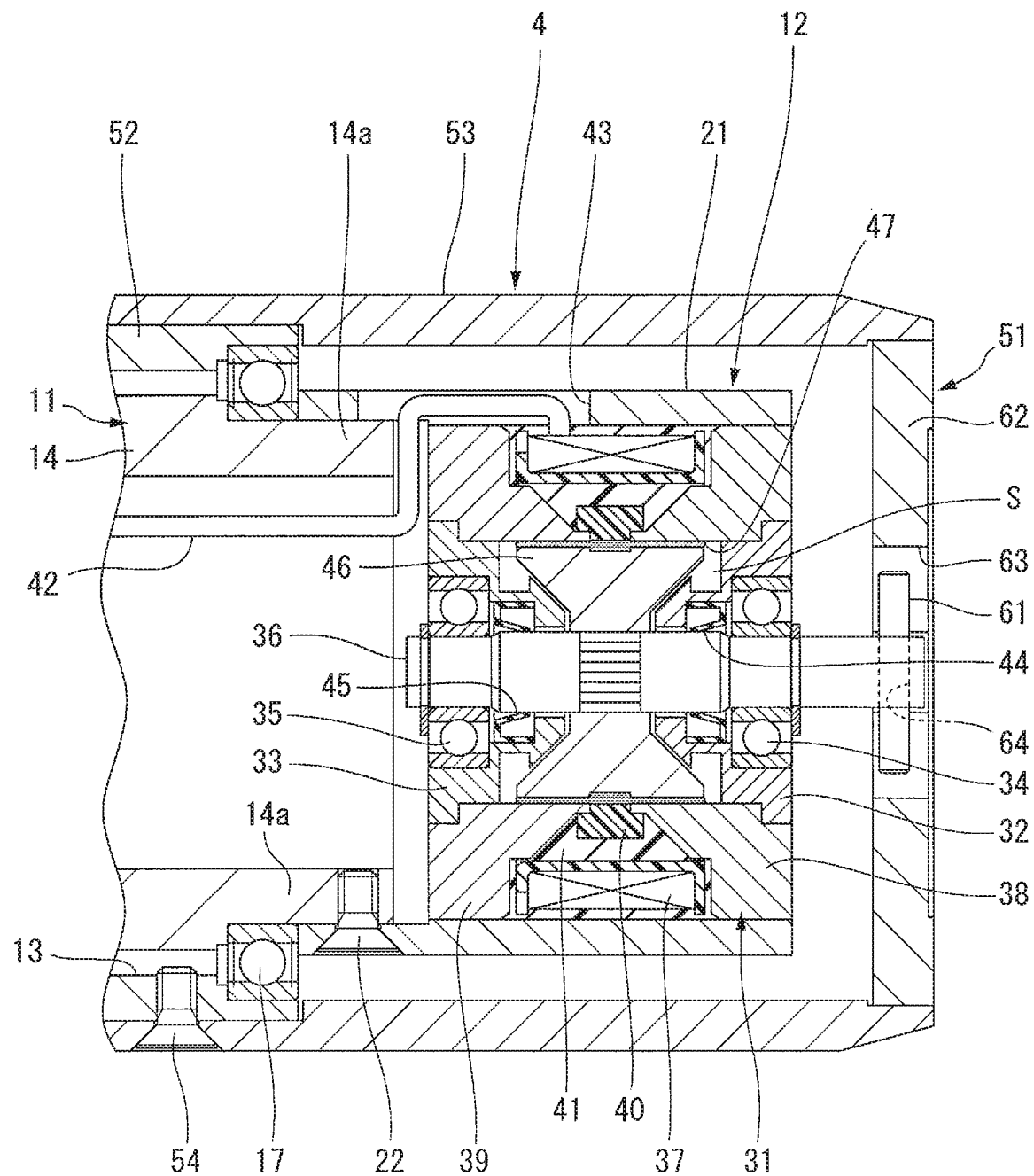
FIG. 3 is an enlarged sectional view of the front end of the spindle unit.
Figure 4:
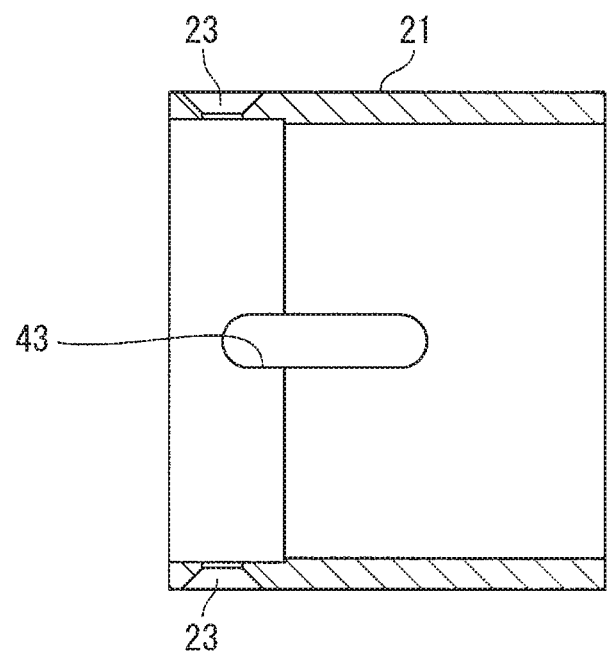
FIG. 4 is a sectional view of a brake housing.
Figure 5:
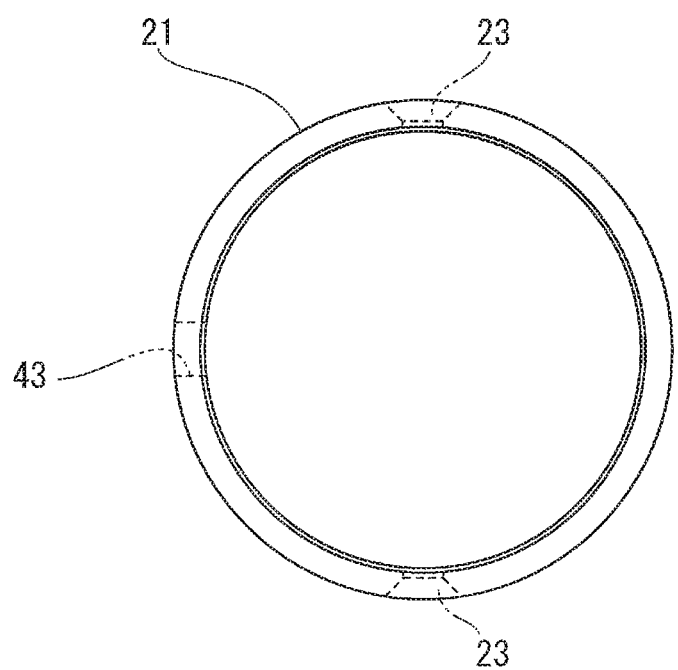
FIG. 5 is a rear view of the brake housing when viewed from the back.

As shown in FIG. 3, the brake 12 (electromagnetic powder brake) according to this embodiment includes a cylindrical field core 31 including the tubular member 21 (housing), and a brake shaft 36 rotatably supported at two ends of the field core 31 in the back-and-forth direction via spacers 32 and 33 and bearings 34 and 35. The brake shaft 36 is provided at the shaft center of the brake 12. Resistance is applied to the brake shaft 36 at the time of rotation.

The field core 31 includes an annular electromagnetic coil 37 fixed at the center in the back-and-forth direction in the tubular member 21, a front core 38 and back core 39 that sandwich the electromagnetic coil 37 from two sides in the back-and-forth direction, and a demagnetization ring 40 sandwiched between the front core 38 and the back core 39 on the inner peripheral side of the electromagnetic coil 37. The front core 38, the back core 39, and the demagnetization ring 40 are annular. The demagnetization ring 40 prevents a magnetic flux passing through a gap between the front core 38 and the back core 39. A space between the front core 38 and the back core 39 is filled with an insulating resin 41.

A lead wire 42 of the electromagnetic coil 37 is pulled out from the electromagnetic coil 37 to the back of the field core 31 through an elongated hole 43 of the tubular member 21, and is guided into the cylindrical member 14 through a gap between the back end of the field core 31 and the cylindrical member 14 of the support shaft 11. The lead wire 42 extends to the back end of the cylindrical member 14 through the inside of the cylindrical member 14, passes through the cylindrical member 14 in the radial direction behind the spindle member 4 (to be described later), and is pulled out from the cylindrical member 14.

A powder containing space S is formed between the paired spacers 32 and 33, the brake shaft 36, and the field core 31. The paired spacers 32 and 33 include seal members 44 and 45 that seal gaps between the spacers 32 and 33 and the brake shaft 36, respectively. The seal members 44 and 45 are positioned between the paired bearings 34 and 35 within the brake 12.

The brake shaft 36 is positioned on the same axis as that of the support shaft 11 and passes through the paired bearings 34 and 35 within the brake 12. A rotor 46 is fixed to the brake shaft 36 so as to rotate together with the brake shaft 36 between the paired bearings 34 and 35. The rotor 46 is formed into a disc shape extending outward in the radial direction from the brake shaft 36 through the paired spacers 32 and 33. The outer peripheral surface of the rotor 46 faces the inner peripheral surfaces of the front core 38 and back core 39 and the inner peripheral surface of the demagnetization ring 40 at a predetermined gap.

The powder containing space S is filled with a powder 47. When the electromagnetic coil 37 is energized, the powder 47 is magnetically attracted to the inner peripheral surface of the field core 31 and the outer peripheral surface of the rotor 46, as shown in FIG. 3. FIG. 3 shows a state in which the electromagnetic coil 37 is energized and the powder 47 is collected between the field core 31 and the rotor 46. The collected powder 47 applies resistance when the rotor 46 rotates together with the brake shaft 36.

The front end of the brake shaft 36 projects forward from the field core 31 and is coupled to the spindle member 4 via a coupler 51 (to be described later).

The spindle member 4 is formed into a cylindrical shape. As shown in FIG. 1, the spindle member 4 includes a spindle base 52 supported by the two bearings 17 and 18 of the above-described support shaft 11, and a front tube 53 connected to the front end of the spindle base 52. The front tube 53 is provided at a position where it covers the brake 12 from the outside in the radial direction. The front tube 53 is equivalent to a "front end of the spindle member covering the electromagnetic air-gap brake".

The spindle base 52 and the front tube 53 are formed from cylinders equal in outer diameter. The spindle base 52 and the front tube 53 are connected by fitting the front tube 53 on the outer peripheral surface of a small-diameter portion 52a of the spindle base 52, and threading, into the small-diameter portion 52a, a fixing screw 54 that passes through the front tube 53 in the radial direction.

Figure 6:
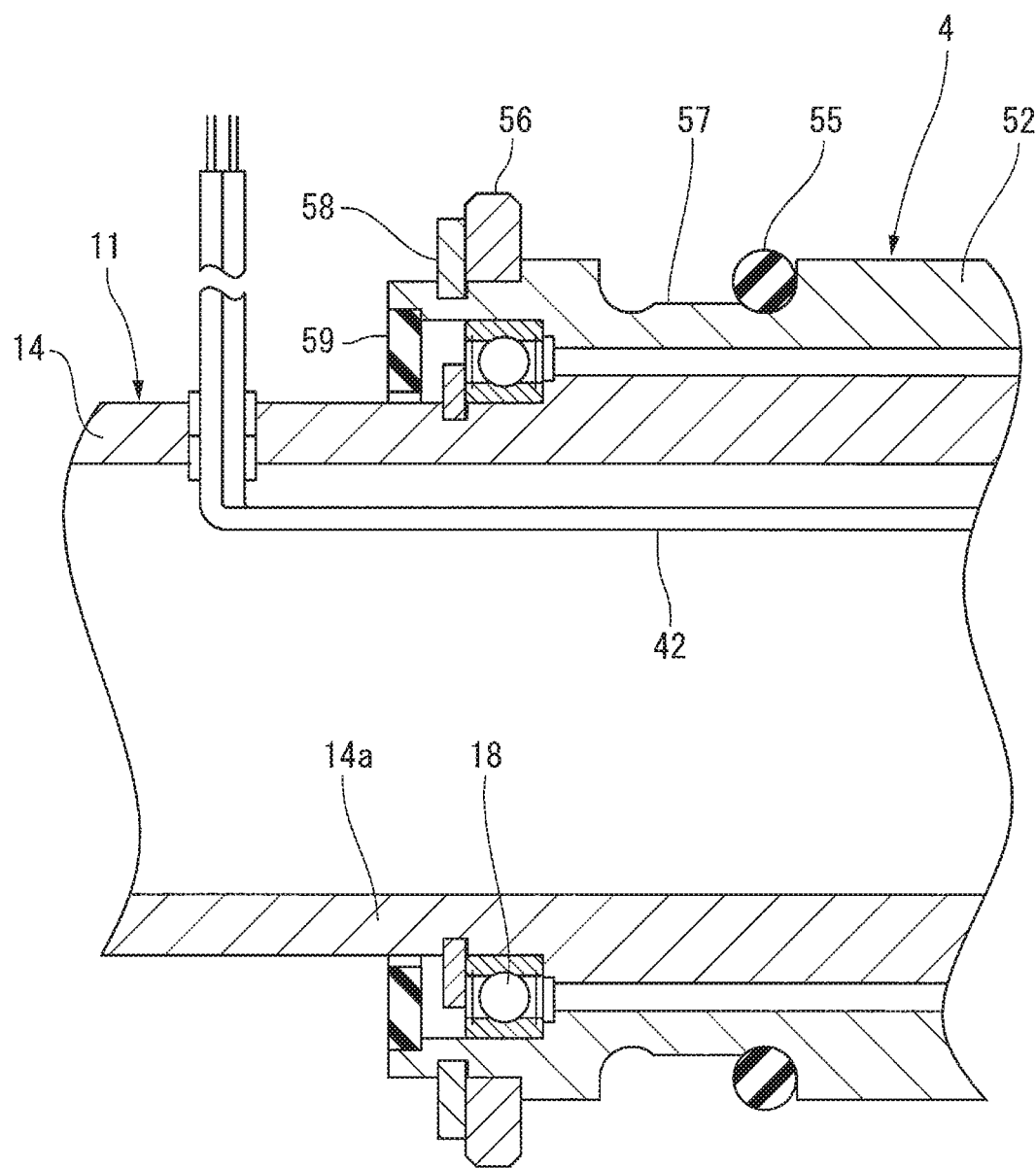
FIG. 6 is an enlarged sectional view of a connecting portion between the back end of a spindle member and a support shaft.

As shown in FIG. 6, an O-ring 55 and an abutting member 56 are provided at the back end of the outer peripheral portion of the spindle base 52. The O-ring 55 is fitted and mounted in an annular recess 57 formed at the outer peripheral portion of the spindle base 52. The O-ring 55 is formed from an elastic material such as rubber or an elastomer, and applies frictional resistance to the bobbin 3 that moves with respect to the spindle member 4. Since the O-ring 55 is interposed between the bobbin 3 and the spindle base 52, the bobbin 3 and the spindle member 4 rotate together upon pulling the thread 2. The O-ring 55 constitutes a "ring-like elastic member".

The annular recess 57 has a depth smaller than the thickness of the O-ring 55 before deformation and a length in the axial direction of the spindle member 4 larger than the thickness of the O-ring 55. That is, the annular recess 57 is formed so that the O-ring 55 can move in the annular recess 57 in the axial direction of the spindle member 4. Before the bobbin 3 is mounted around the spindle member 4, the O-ring 55 is positioned on the front-end side of the annular recess 57, as shown in FIG. 6. When the bobbin 3 is mounted around the spindle member 4, the O-ring 55 is pushed by the bobbin 3 and moves to the back-end side of the annular recess 57, as shown in FIG. 1. In this state, the bobbin 3 moves forward or in the circumferential direction with respect to the spindle member 4, applying resistance generated by friction against the O-ring 55.

The abutting member 56 is formed from a ring fitted in the back end (end opposite to the brake 12) of the outer peripheral portion of the spindle base 52, and projects outward from the outer peripheral portion in the radial direction of the spindle base 52. A snap ring 58 is engaged with the spindle base 52 at a position adjacent to the back of the abutting member 56. The snap ring 58 prevents backward movement of the abutting member 56.

A lid 59 is provided at a gap between the backside open end of the spindle base 52 and the back end of the support shaft 11. The lid 59 is formed from rubber, an elastomer, or the like in an annular shape and fixed to the inner peripheral surface of the spindle base 52. The lid 59 closes the gap.

Figure 2:
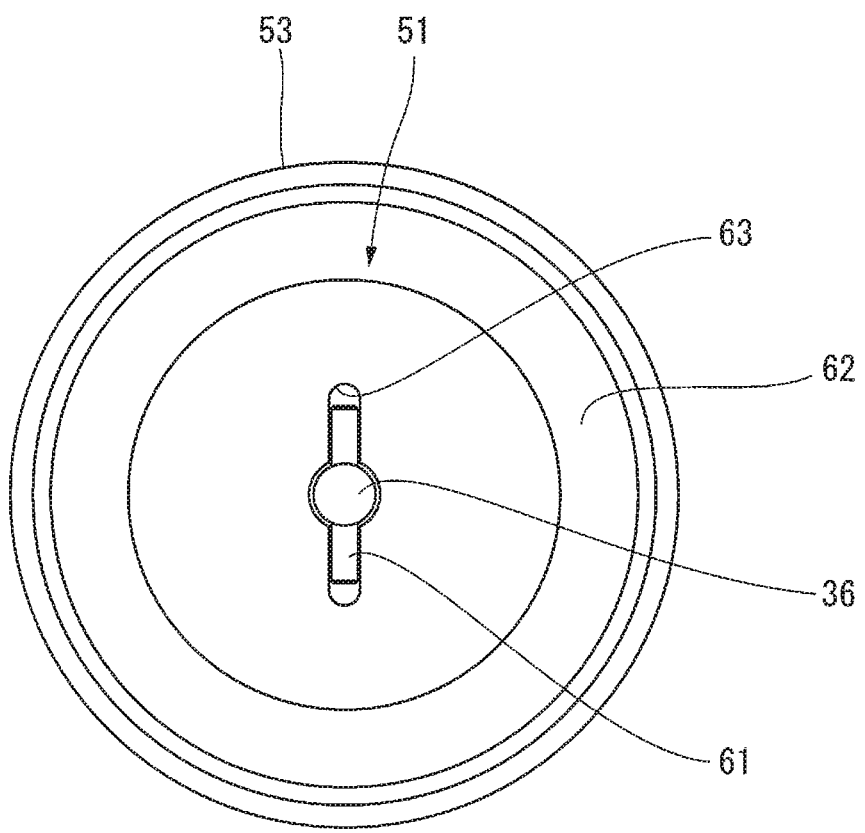
FIG. 2 is a front view of the spindle unit when viewed from the front.

As shown in FIG. 3, the front end of the front tube 53 is coupled to the front end of the brake shaft 36 via the coupler 51. The coupler 51 includes a coupling pin 61 crossing the brake shaft 36, a lid 62 that is provided at the front end of the front tube 53 and closes the front end of the front tube 53, and a hole 63 formed in the lid 62 so that the coupling pin 61 is engaged with the hole 63. As shown in FIG. 2, the hole 63 according to this embodiment is formed to pass through the lid 62, like an opening in which the brake shaft 36 and the coupling pin 61 are fitted.

The brake shaft 36 has a through hole 64 that extends through the shaft center perpendicularly to the brake shaft 36. The coupling pin 61 is, for example, pressed into the through hole 64 of the brake shaft 36 and is fixed to the brake shaft 36. The coupling pin 61 is engaged with the hole 63 of the lid 62 and couples the spindle member 4 and the brake shaft 36 so that they interlock via the coupler 51.

When mounting the bobbin 3 around the spindle unit 1 having the above-described arrangement, the front end of the spindle member 4 is first inserted into the hollow portion of the bobbin 3. Then, the bobbin 3 is pushed back with respect to the spindle member 4. At this time, the back end of the bobbin 3 abuts the abutting member 56 to prevent the backward movement and stop the bobbin 3. In the process of mounting the bobbin 3 in the spindle member 4, the O-ring 55 is sandwiched between the spindle base 52 and the inner peripheral surface of the bobbin 3, elastically deformed and in this state, moves to the back end within the annular recess 57.

When the thread 2 is pulled out from the bobbin 3 by the weaving machine in the state in which the bobbin 3 is mounted around the spindle unit 1, the bobbin 3 and the spindle member 4 rotate together. The rotation of the spindle member 4 is transmitted to the brake shaft 36 via the coupler 51. If the electromagnetic coil 37 of the brake 12 is energized at this time, brake torque acts on the brake shaft 36 to apply resistance at the time of rotating the spindle member 4 and apply tension to the thread 2 pulled by the weaving machine. The strength of the tension can be controlled by changing power supplied to the electromagnetic coil 37.

In the spindle unit 1 according to this embodiment, the brake 12 is housed in the spindle member 4. According to this embodiment, a compact spindle unit can be provided in comparison with a case in which the spindle member and the brake are arranged side by side.

The electromagnetic air-gap brake 12 according to this embodiment is an electromagnetic powder brake. A spindle unit downsized in the axial direction is obtained in comparison with using an electromagnetic air-gap brake of another type in which a magnetic member and a magnet are arranged side by side in the axial direction.

The coupler 51 according to this embodiment includes the coupling pin 61 crossing the brake shaft 36, the lid 62 that is provided at the front tube 53 (front end covering the brake 12) of the spindle member 4 and closes the front tube 53, and the hole 63 that is formed in the lid 62 and engaged with the coupling pin 61. The lid 62 can prevent entrance of a foreign matter such as thread waste into the spindle member 4. A spindle unit with high reliability of operation can be provided.

The spindle unit 1 according to this embodiment includes the O-ring 55 (elastic ring member) mounted on the outer peripheral portion of the spindle member 4. The O-ring 55 applies frictional resistance to the bobbin 3 that moves with respect to the spindle member 4. The bobbin 3 and the spindle member 4 always rotate together, and the strength of the tension can be controlled precisely.

The support shaft 11 according to this embodiment includes the cylindrical member 14 that rotatably supports the spindle member 4. The lead wire 42 of the brake 12 is laid out through the inside of the cylindrical member 14. The cylindrical member 14 can rotatably support the spindle member 4 without interference with the lead wire 42 of the electromagnetic coil 37. According to this embodiment, a spindle unit downsized in the radial direction can be provided.

The spindle unit 1 according to this embodiment includes the annular lid 59 positioned between the back end of the support shaft 11 and the open end of the spindle member 4 near the back end of the support shaft 11. The lid 59 can prevent entrance of a foreign matter such as thread waste into the back end of the spindle member 4. A spindle unit with higher reliability of operation can be provided.

The spindle unit 1 according to this embodiment includes the abutting member 56 that is formed at the back end (end opposite to the brake 12) of the spindle member 4 and projects outward in the radial direction from the outer peripheral portion of the spindle member 4. Hence, the bobbin 3 can be easily mounted at a correct position in the spindle unit 1. The rotation of the bobbin 3 is accurately transmitted to the spindle member 4, increasing the reliability of operation of applying tension to the thread 2.

What is claimed is:

1. A spindle unit comprising:
   a support shaft that includes a first end that includes an attaching structure to a stationary frame, and a second end;
   an electromagnetic air-gap brake that includes a brake shaft to which resistance is applied upon rotation, and that is connected to the second end of the support shaft and positioned on the same axis as an axis of the support shaft;
   a spindle member that is formed into a cylindrical shape and is rotatably supported by the support shaft in a state in which the support shaft and the electromagnetic air-gap brake are inserted in the spindle member, a thread-wound bobbin being detachably mounted around the spindle member; and
   a coupler that couples the spindle member and the brake shaft to make the spindle member and the brake shaft interlock with each other.

2. The spindle unit according to claim 1, wherein the electromagnetic air-gap brake is an electromagnetic powder brake.

3. The spindle unit according to claim 1, wherein the coupler includes:
   a coupling pin that crosses the brake shaft;
   a lid that is provided at a front end, of the spindle member, covering the electromagnetic air-gap brake and closes the front end; and
   a hole that is formed in the lid and engaged with the coupling pin.

4. The spindle unit according to claim 1, further comprising a ring-like elastic member that is mounted on an outer peripheral portion of the spindle member and applies frictional resistance to the bobbin moving with respect to the spindle member.

5. The spindle unit according to claim 1, wherein
the support shaft further includes a cylindrical member that rotatably supports the spindle member, and
the electromagnetic air-gap brake further includes a lead wire that is laid out through an inside of the cylindrical member.

6. The spindle unit according to claim 1, further comprising an annular lid that closes a gap between the first end of the support shaft and an open end of the spindle member near the first end of the support shaft.

7. The spindle unit according to claim 1, further comprising an abutting member that is formed at a back end of the spindle member and projects outward in a radial direction of the spindle member from an outer peripheral portion of the spindle member.

8. The spindle unit according to claim 1, wherein the spindle member includes:
 a spindle base that is rotatably supported by the support shaft; and
 a front tube that is connected to a front end of the spindle base and covers the electromagnetic air-gap brake.

9. The spindle unit according to claim 4, wherein the outer peripheral portion of the spindle member includes an annular recess having a depth smaller than a thickness of the elastic member and a length in an axial direction of the spindle member larger than the thickness of the elastic member.

* * * * *